June 5, 1923.

J. M. MAJEWSKI, JR 1,457,588

AUTOMATIC BAND SAW FILING AND SETTING MACHINE

Filed May 2, 1919 4 Sheets-Sheet 1

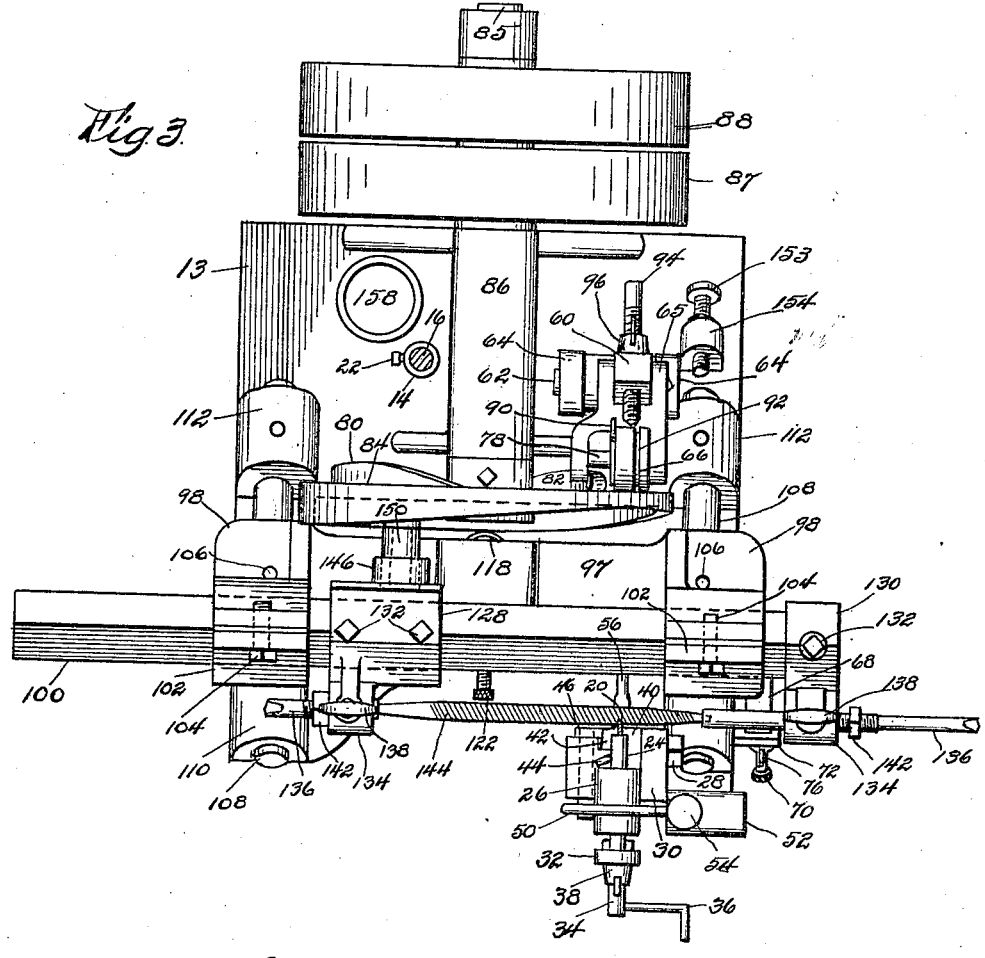
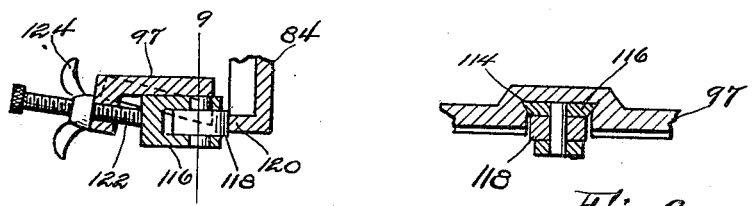

June 5, 1923.

J. M. MAJEWSKI, JR 1,457,588

AUTOMATIC BAND SAW FILING AND SETTING MACHINE

Filed May 2, 1919

Witness:
R. E. Hamilton

Inventor,
Jos. M. Majewski, Jr.,
By Chas. C. Gerard,
Attorney.

Patented June 5, 1923.

1,457,588

UNITED STATES PATENT OFFICE.

JOSEPH M. MAJEWSKI, JR., OF KANSAS CITY, MISSOURI.

AUTOMATIC BAND-SAW FILING AND SETTING MACHINE.

Application filed May 2, 1919. Serial No. 294,259.

*To all whom it may concern:*

Be it known that I, JOSEPH M. MAJEWSKI, Jr., a citizen of the United States, and resident of Kansas City, county of Jackson, and State of Missouri, have invented certain new and useful Improvements in Automatic Band-Saw Filing and Setting Machines, of which the following is a complete specification.

The present invention relates to machines for carrying out the operation of sharpening and setting saws, with more particular reference to band saws, and one of the objects in view is to provide an improved, compact construction of machine adapted to perform the required sharpening and setting functions while the saw is fed through the machine in a vertical line and thus requiring a minimum of space for its operation.

One of the features of the invention is the provision of an improved sharpening or filing mechanism in which the sharpening or filing tool is so manipulated as to be inserted and disengaged from the teeth of the saw in a direction corresponding in general to the slope of the teeth and thereby eliminating the possibility of injury to the teeth of the saw during the shifting of the tool.

Another object of the invention is to provide an improved setting tool structure of a reversible character and adapted, when reversed, to form the holding means for the file or saw sharpening device.

A further feature of the improvements resides in a novel form of saw-feeding mechanism having a variety of adjustments for accommodating it to the requirements of the particular saw being operated upon, and also arranged for producing the different character of feeding movements required in the sharpening and the setting operations.

A still further object of the invention is to provide an improved saw-holding means adapted for effectively holding the saw during the filing and setting operations and for releasing the same for successive feeding movements, and also having provision for proper adjustment to position the saw according to requirements.

It is also sought to provide a practical, durable and comparatively simple form of construction for efficiently carrying out the desired objects of the invention, and one which will be entirely automatic in its operation.

With these general objects in view, the invention will now be described with reference to the accompanying drawings wherein is illustrated one form of construction which has been devised for embodying the proposed improvements, after which the features therein deemed to be novel will be set forth and particularly defined in the appended claims.

In the drawings—

Figures 3 and 4 are plan and side views, respectively, of the same;

Figure 8 is a detail sectional view of the cam and roller structure for reciprocating the tool carriage between saw-feeding operations;

Figure 9 is a section taken on the line 9—9 of Figure 8;

Figure 10 is a rear face view of the cam disk showing the cams whereby the saw-feeding mechanism is operated, and also representing the position of the cam roller with relation to said disk, the broken lines representing the alternative position of said roller; and Figure 11 is a fragmentary plan view illustrating the mounting of the tools for the saw setting operation.

Figure 1:
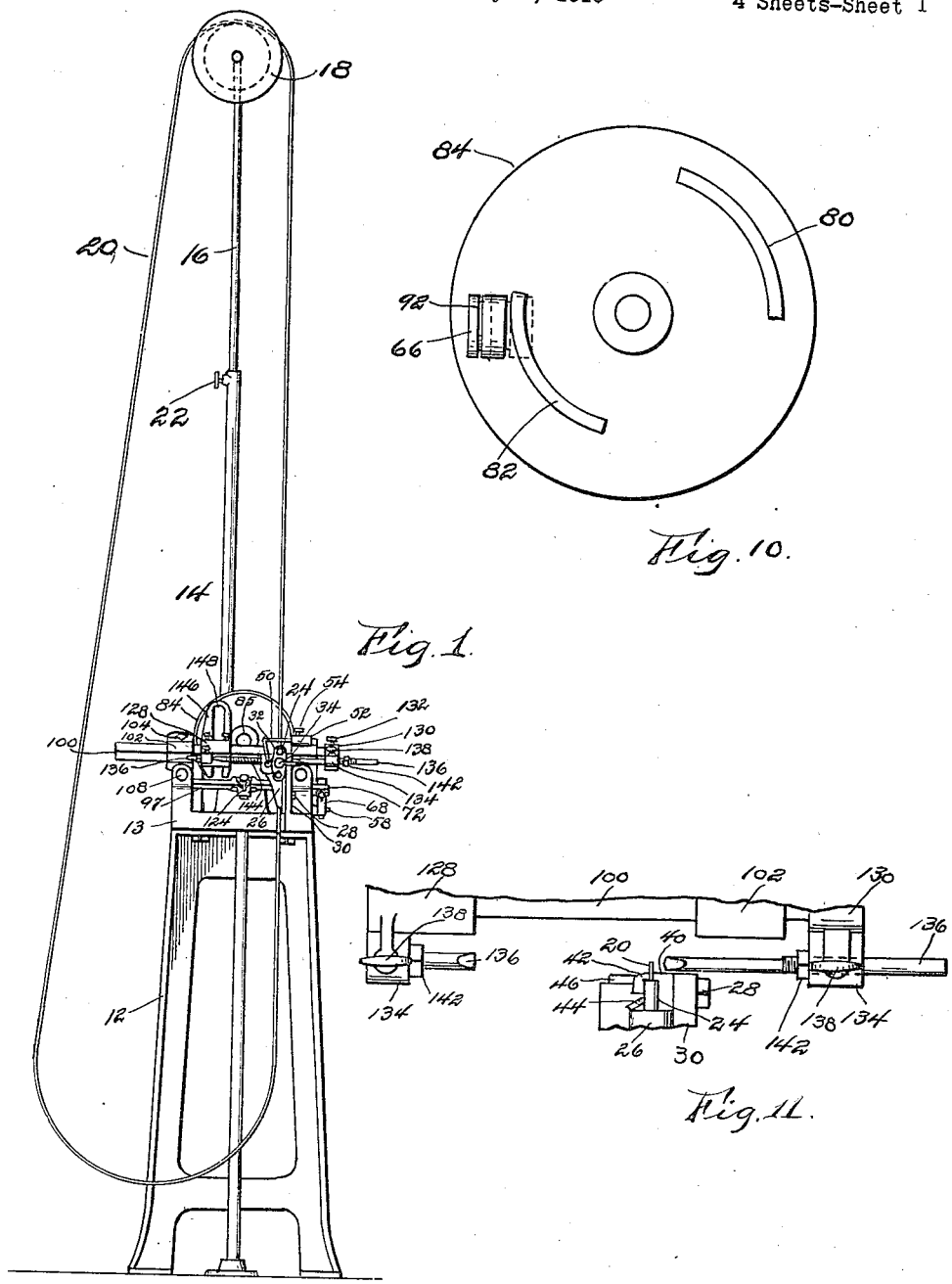
Figure 1 is a front elevation of a machine constructed in accordance with the present invention.

Referring now to the drawings in detail, these illustrate the apparatus as comprising a supporting framework 12 carrying a bed-plate 13 for mounting the main working parts of the machine, including a tubular upright 14 supporting a sliding rod 16 having a grooved sheave wheel 18 at its upper end for suspending a band saw 20 in the relation shown in Figure 1, said rod 16 being clamped in the required position by means of a clamping screw 22.

Suitable means is provided for properly positioning and holding the saw 20 during the filing and setting operations, as well as for permitting the saw to be intermittently fed during said operations. This means comprises a pair of spaced stop pins 24 engaging the straight back edge of the saw (see Figure 5), said pins 24 being slidingly mounted in a block 26 secured by bolts 28 to a post 30 projecting up from the bedplate 13. The outer ends of the pins 24 are connected by a tie-plate 32 provided with an adjusting screw 34 which is threaded into the block 26, whereby the stop pins 24 are simultaneously adjusted for different widths of saws, the screw 34 having an operating handle 36 and also a thumb nut 38 for clamping said screw.

Figure 7:
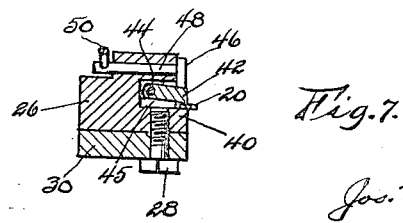
Figure 7 is a horizontal detail section of the saw clamping elements.

Intermediate the stop pins 24 is provided a saw clamping structure comprising a fixed jaw 40 formed as a part of the block 26, and a movable clamping jaw 42 pivoted upon a pin 44 with a recess 45 formed in said block 26 (see Figure 7). In engagement with said movable jaw 42 for holding it in clamping relation to the saw 20 is an eccentric element 46 carried by a pin 48 journaled in one side of the block 26, said pin 48 also carrying an angular arm 50 having a horizontal portion provided with an adjustable counterweight 52 clamping in adjusted position on said arm by a set screw 54 (see Figure 2). This arrangement of clamping means is such as to securely hold the saw 20 against any tendency to downward movement, while automatically releasing the saw for upward feeding movement by means of a feeding mechanism now to be described.

Figure 4:
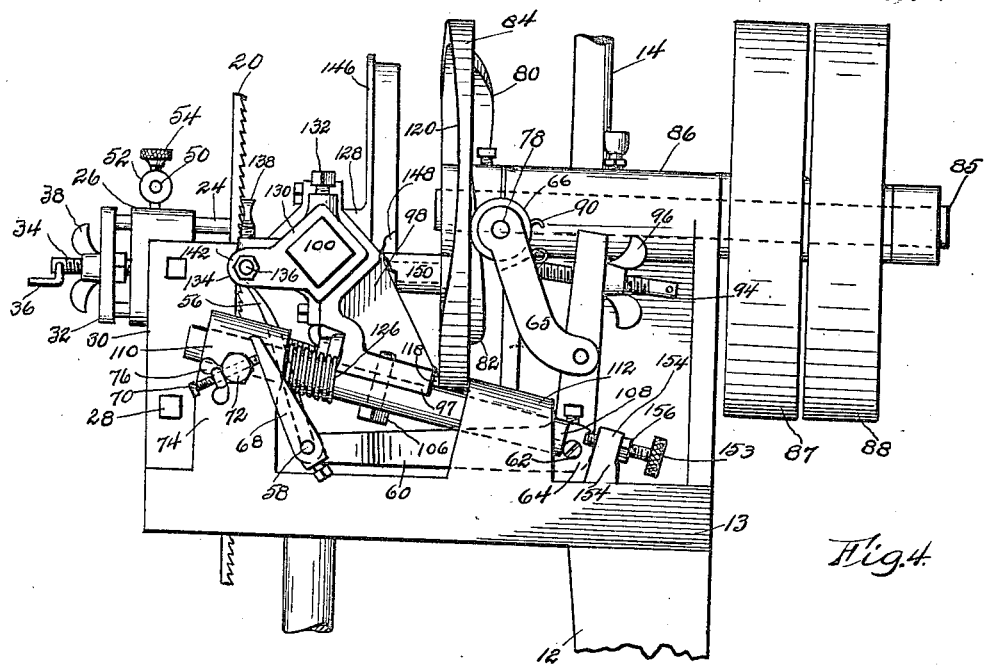
Figures 5, 6:
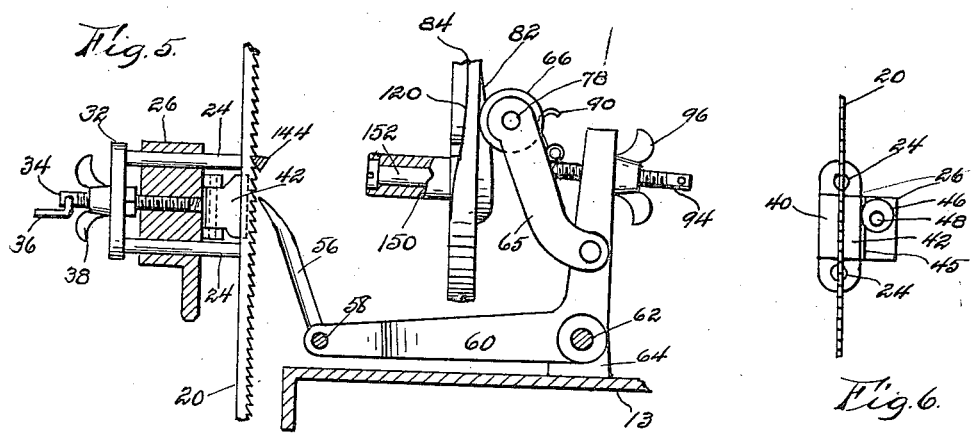
Figure 5 is a vertical sectional detail view of the saw holding and feeding mechanism;
Figure 6 is a rear face detail view of the saw positioning and clamping elements.

The saw feeding mechanism comprises a sawtooth engaging pawl 56 which is secured to a pivot pin 58 journaled in one arm of a bell crank lever 60 fulcrumed at 62 in bearing lugs 64 on the bedplate 13, the other arm of said lever 60 carrying a swinging arm 65 having a forked end portion carrying a cam roller 66 (see Figures 4 and 5). To the pin 58 is also secured a pawl-lifting arm 68, the free end of which is adapted to engage one end of a screw 70 adjustably mounted in a lug 72 projecting laterally from a bearing post 74, a wing nut 76 serving to secure said screw 70 in adjusted position. The forked end of the arm 65 is so proportioned as to permit lateral shifting of the roller 66 (see Figure 3) on its bearing pin 78 into either of two positions on said pin, whereby said roller may be caused to engage either a cam rib 80 singly, or both said rib 80 and a second cam rib 82, the said cam ribs 80 and 82 occupying radially different positions on the rear face of a cam disk 84 (see Figure 6) which is secured to a shaft 85 mounted in a bearing 86 and provided with fast and loose pulleys 87, 88. The cam roller 66 is of such width as to be operated by the cam rib 80 in either position of said roller, and, on shifting of said roller into the position represented by the broken lines in Figure 10, to be operated also by the cam rib 82, said roller being retained in either of said positions by means of a spring 90 engaging one side of the roller when in the full-line position and engaging a groove 92 in the roller when in said broken-line position. The rear arm of the bell crank lever 60 carries an adjustable stop screw 94 engaging the arm 65, for controlling the relative position of said arm and lever, said screw being set by means of a wing nut 96.

The means which is provided for supporting the saw filing and setting devices comprises a tool carriage structure which is made up of a bracket frame 97 having at its opposite ends a pair of upwardly projecting bracket portions 98 slidingly supporting the tool-carriage proper in the form of a bar 100 which is retained on said bracket portions 98 by means of cap pieces 102 and screws 104. The bracket frame 97 is secured by screws 106 to a pair of sliding bearing rods 108 which are slidingly mounted in inclined bearings 110 and 112 at opposite sides of the bedplate 13, the inclination of said bearings approximating, in its general direction, the slope of the teeth of the saw 20 when the latter is positioned as represented in Figure 4 of the drawings. The intermediate portion of the bracket frame 97 is formed with a horizontal undercut groove 114 for adjustably accommodating a bearing block 116 which carries a roller 118 adapted to engage a cam 120 formed on the front face of the disk 84 (see Figures 8 and 9). The position of the bearing block 116 is adjusted by means of a screw 122 carried by the frame 97 and clamped by a wing nut 124. The tool carriage is thus adapted to be reciprocated by the cam 120 toward and from the saw holding means, and against the action of springs 126 which are interposed between the bracket portions 98 and the corresponding bearings 110 and 112 (only one spring 126 being shown—see Figure 4), said springs 126 returning the tool carriage to rearward position as the roller 118 rides over the low portion of the cam 120.

Figure 2:
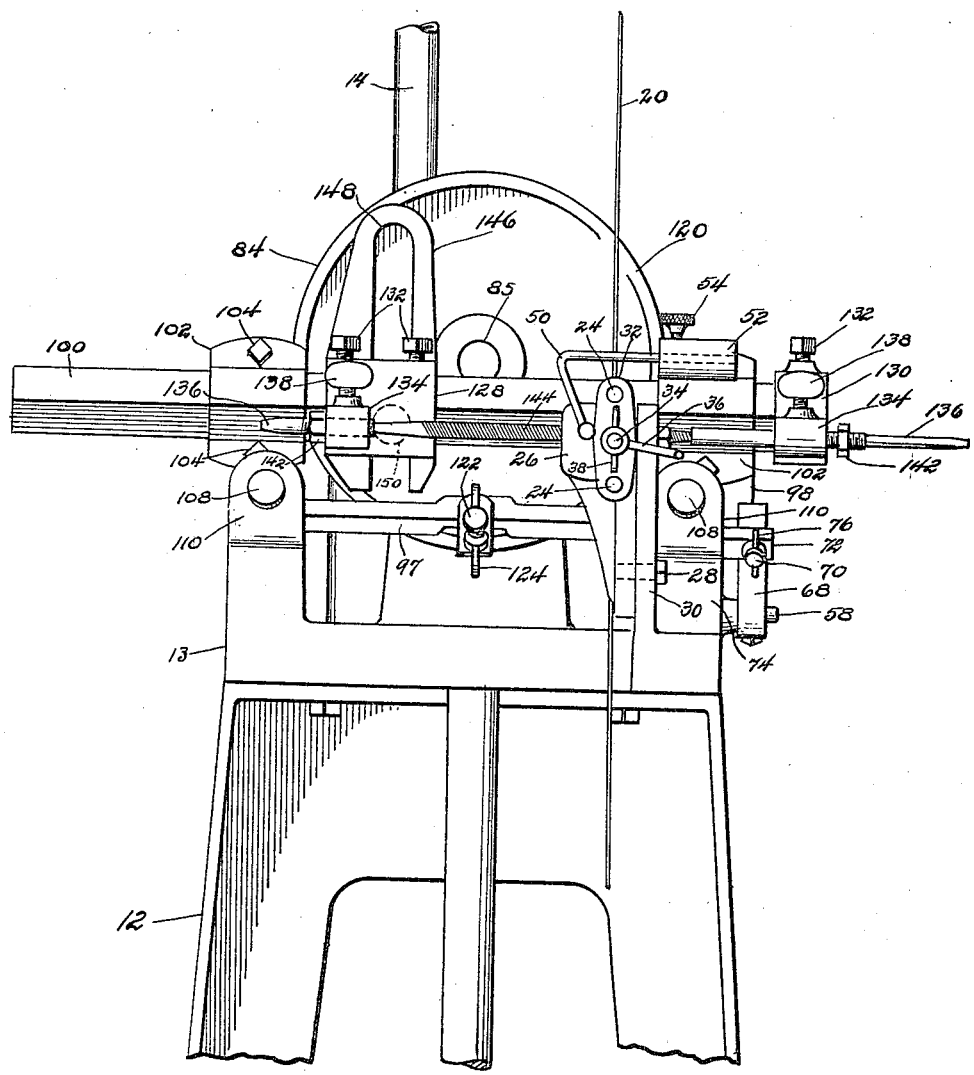
Figure 2 is a similar view of the main portion of the machine, but on a larger scale.

The tool-carrying bar 100 is provided with a pair of adjustable bracket members 128, 130, secured to the bar by means of clamping screws 132. These bracket members are formed with forwardly projecting tool-carrying lugs 134 provided with alined openings for the mounting of the saw pointing or setting tools 136 which are clamped in position for the saw-setting operation by means of set screws 138, as illustrated in Figure 11, said setting tools 136 carrying adjustable nuts 142 for engagement with the inner face of the lugs 134. The tools 136 are reversably mounted in the bearing lugs 134 and have their opposite ends suitably recessed for engaging and supporting a saw-sharpening tool, such as a file 144, in saw filing position, as shown in Figures 2 and 3.

One of the bracket members 128 is formed with an upright arm 146 in which is provided a roller passage 148 for receiving a roller 150 suitably journaled upon a pin 152 provided on the front face of the cam disk 84 and projecting within said passage 148. By this means the rotating of the cam disk 84 operates to reciprocate the tool carriage (the bar 100 sliding within the bearings formed by the brackets 98), and the roller 150 is of such dimensions as to maintain engagement with the sides of the roller passage 148 as the tool carriage is reciprocated toward and from the saw-holding means by the operation of the cam 120 and roller 118, as above described.

In the operation of the apparatus, the saw 20 is positioned and clamped in the saw holding means, as above explained, with the teeth of the saw sloping in a downward direction to the rear. The adjustable stop pins 24 enable the holding means to be accommodated to different widths of saws, the saw being positioned so that its teeth project beyond the edges of the clamping jaws 40, 42. For the saw sharpening operation, the saw setting tools are mounted in their reversed positions for embracing the opposite ends of the file 144, as illustrated in Figure 3, the setting tools 136 being adjusted for this purpose in accordance with the length of the file, the clamping screws 132 operating to secure the tools 136 after the file has been positioned with one of its filing edges in proper relation to the teeth of the saw, as represented in Figure 5. Since the springs 126 operate to maintain the roller 118 in engagement with the cam 120, the adjustment of this roller determines the limit of movement of the tool carriage in the direction of the saw, that is to say, varies the initial position of the carriage when the roller 118 is at the lowest point on the cam 120; hence, by operation of the screw 122 to set the roller 118, a further adjustment is obtained for properly positioning the filing tool, as, for example, in accordance with the size or width of the file, or the size of the teeth of the saw. The feeding mechanism is next regulated according to the requirements of the particular saw being operated upon, and for advancing the saw one tooth for each operating movement of the file as is required in sharpening. For this purpose the screw 70 is manipulated and set so as to cause the arm 68, when actuated from the cam roller 66, to present the pawl 56 in proper relation to the teeth of the saw, i. e., at the proper angle thereto, and to allow engagement of the pawl therewith by entering the full depth of the notches between the teeth as is necessary for a proper and efficient feeding action. This adjustment is carried out to meet the conditions as to size or fineness of the saw teeth, their rake or slope, and the extent of their projection from the saw holding means. Further adjustment of the pawl is accomplished by operation of the screw 94, whereby the pawl is adjusted bodily about the axis 62 of the bell crank lever, this adjustment, however, being provided mainly for accommodating the feeding adjustment to the carriage adjustment which is made by the regulation of the roller 118. Finally, the feeding mechanism is set for the sharpening operation by positioning the roller 66 for engagement only by the cam rib 80 in order that each rotation of the cam disk 84 will effect but one actuation of the feeding mechanism and thus advance the saw a single tooth for each operative stroke of the file 144. By means of this construction, then, the tool carriage is moved forward by the roller 18 and cam 120 to insert the file between the teeth of the saw, this movement occurring in a direction corresponding approximately to the slope of the saw teeth, after which the tool carriage is reciprocated at right angles to the plane of the saw to effect the filing operation, whereupon the carriage is retracted by the action of the springs 126, disengaging the file at the same angle, and the saw feeding movement takes place, advancing the saw one tooth for each complete reciprocation of the carriage by the roller 150. By this operation the saw is sharpened evenly, accurately and effectively and without any injury to the saw teeth such as results from improper movements of the file during the feeding action.

In changing over to the saw setting operation, the roller 66 is simply shifted on its axis into the broken-line position indicated in Figure 10 in order to be actuated by both of the cam ribs 80 and 82 and thereby effect an advance movement of two saw teeth for each rotation of the cam disk 84, or one for each transverse reciprocatory stroke of the tool carriage, the forward and backward movement of which is now dispensed with in order to maintain the setting tools in a fixed operative path intersecting the line of the saw teeth, for which purpose a screw 153 is provided for engagement with one of the bearing rods 108 and maintaining the tool carriage in forward position against the action of the springs 126, said screw 153 being mounted in a lug 154 and held in fixed adjustment by means of a clamping nut 156. The setting tools 136 are removed from the bearings 134, the file taken out, and said tools 136 again reversed in position and reclamped in the bearings 134 by means of the screws 138. The operation of the machine now effects an operative stroke of said setting tools, alternately, for each reciprocatory stroke of the tool carriage, and correspondingly, a feeding movement of the saw for each operation of said tools, or an advance of the saw one tooth for each reciprocatory stroke of the tool carriage.

The adjustable supporting members 14 and 16 enable various lengths of saws to be accommodated on the machine, and preferably the said members are located to one side of center in order to bring one side of the saw in a vertical line with the saw-holding means, for more effective and accurate feeding. A tool-holding receptacle 158 is provided on the bedplate 13 for convenience in maintaining a supply of the tools, particularly the files, ready for use in the machine.

It is thus apparent, from the foregoing, that an efficient and practical apparatus has been provided for embodying the proposed features of improvement and for carrying out the desired objects of the invention, and while I have described and illustrated in detail what I now regard as the preferred form of construction for embodying the improvements, I desire to reserve the right to make all such formal changes or modifications as may fairly fall within the scope of the following claims.

Having described the invention, what I claim and desire to secure by Letters-Patent is:

1. A machine of the character described comprising saw-holding means arranged to hold the saw with its teeth in a vertical line, and filing means comprising a filing tool and tool-carriage, means for reciprocating said carriage for imparting a filing motion to said tool, means for moving said carriage transversely with reference to said filing motion for inserting and withdrawing said tool from engagement with said teeth, and means for confining the transverse movement of said carriage to a single plane located at an angle corresponding to the slope of said teeth.

2. A machine of the character described comprising saw-carrying means, and saw-filing means comprising a filing tool and tool carriage including a tool-carrying bar, means for reciprocating said bar for imparting a filing motion to the tool, means for moving said carriage transversely with reference to said filing motion for inserting and withdrawing said tool from engagement with said teeth, and fixed bearings for slidingly supporting said carriage, said bearings being arranged at an inclination corresponding to the slope of said teeth for restricting the transverse movement of said carriage to a single plane.

3. A machine of the character described comprising saw-carrying means, and saw-filing means comprising a filing tool and tool carriage including a tool-carrying bar, means for reciprocating said bar for imparting a filing motion to the tool, means for moving said carriage transversely with reference to said filing motion for inserting and withdrawing said tool from engagement with said teeth, fixed bearings for slidingly supporting said carriage, said bearings being arranged at an inclination corresponding to the slope of said teeth for restricting the transverse movement of said carriage to a single plane, and means for varying the initial position of said carriage with reference to said carriage-moving means.

4. A machine of the character described comprising a reciprocating tool carriage, and saw setting tools supported in alinement on said carriage, said saw setting tools being reversibly mounted on said carriage and adapted to cooperate to support a saw filing tool when said setting tools are in reversed position.

5. A machine of the character described comprising a reciprocating tool carriage, and saw setting tools supported in alinement on said carriage, each of said tools having one of its ends formed for supporting engagement with one end of a saw filing tool, said setting tools being reversibly and adjustably mounted on said carriage for accommodating various lengths of saw filing tools and for supporting a saw filing tool when said setting tools are in reversed position on said carriage.

6. A machine of the character described comprising saw holding means arranged to hold the saw with its teeth in a vertical line, and filing and setting means comprising a tool carriage carrying saw filing and setting tools, means for reciprocating said carriage for operatively moving said tools, means for moving said carriage during the filing operation in a direction for inserting and withdrawing the filing tool from engagement with said teeth at an angle corresponding to the slope of the teeth, and means for rendering said last-named means inoperative during the setting operation.

7. A machine of the character described comprising saw holding means arranged to hold the saw with its teeth in a vertical line, and filing and setting means comprising a tool carriage carrying saw filing and setting tools, means for reciprocating said carriage for operatively moving said tools, and means for advancing the saw one tooth for each double reciprocation of the tool carriage during the filing operation, said last-named means being adjustable to cause the same to advance the saw one tooth for each reciprocatory stroke of the tool carriage during the setting operation.

8. A saw filing and setting machine comprising movable and fixed clamping jaws for holding the saw, saw feeding means adapted to engage successive teeth of the saw to feed the same in one direction, and an eccentric element provided with a counter-weighted arm operating to hold said element in clamping engagement with said movable jaw for locking the saw against movement in the opposite direction, said eccentric element and arm acting automatically to release said movable jaw under the action of said feeding means to permit movement of the saw in the feeding direction.

9. A saw filing and setting machine comprising saw holding means, and automatic means for feeding the saw including a pivoted pawl adapted to engage the teeth of the saw, means for adjusting said pawl about its pivotal axis and limiting its movement in the direction of the saw, and means for adjusting said pawl bodily about another axis parallel to the pivotal axis of the pawl for shifting said pawl longitudinally of the saw.

10. A saw filing and setting machine comprising saw-holding means and means for feeding the saw, said feeding means comprising a cam-operated pawl adapted to engage the teeth of the saw, a lever pivotally supporting said pawl, means for adjusting said pawl about its pivotal axis and limiting its movement in the direction of the saw, a cam-engaging arm carried by said lever, and means for adjusting said arm relatively to said lever for shifting said pawl longitudinally of the saw.

11. A saw filing and setting machine comprising saw holding means, a reciprocating tool carriage, saw setting tools supported in alinement on said carriage, said tools being reversibly mounted on said carriage and cooperating, when in reversed position, to support a saw filing tool, and saw feeding means operative to advance the saw one tooth for each double reciprocation of the tool carriage during the filing operation, said feeding means being adjustable to cause the same to advance the saw one tooth for each reciprocatory stroke of the tool carriage during the setting operation.

12. A saw filing and setting machine comprising saw holding means, a reciprocating tool carriage, saw setting tools supported in alinement on said carriage, said tools being reversibly mounted on said carriage and cooperating, when in reversed position, to support a saw filing tool, saw feeding means operative to advance the saw one tooth for every other reciprocatory stroke of the tool carriage during the filing operation, said feeding means being adjustable to cause the same to advance the saw one tooth for each reciprocatory stroke of the tool carriage during the setting operation, means operative during the filing operation to move said carriage in a direction for inserting and withdrawing the filing tool from engagement with said teeth at an angle corresponding to the slope of the teeth, and means for rendering said last-named means inoperative during the setting operation and maintaining said carriage with said setting tools in operative position on opposite sides of the saw teeth.

13. In a saw filing and setting machine, saw holding means, and means for intermittently feeding the saw past said holding means, said saw holding means comprising spaced adjustable stop members in engagement with the straight back edge of the saw, and relatively movable clamping elements engaging the saw intermediate said stop members, said clamping elements operating to intermittently clamp and release the saw in response to the action of said feeding means.

14. A machine of the character described comprising saw holding means arranged to hold the saw with its teeth in a vertical line, and filing means comprising a filing tool and tool carriage, said carriage being mounted for reciprocatory movement at right angles to the plane of the saw and also for reciprocatory movement in a direction corresponding to the slope of the saw teeth, means for intermittently feeding the saw, means operating between each feeding movement of the saw for reciprocating said carriage at right angles to the plane of the saw to impart a filing motion to said tool, and means operating between each filing operation to reciprocate the carriage in the direction of the slope of the saw teeth to disengage the tool therefrom while the saw is fed.

In witness whereof I hereto affix my signature.

JOSEPH M. MAJEWSKI, Jr.